No. 727,492. PATENTED MAY 5, 1903.
W. T. & E. Y. TEMPLE.
FOLDING TOP FOR VEHICLES.
APPLICATION FILED SEPT. 19, 1902.
NO MODEL. 3 SHEETS—SHEET 1.

WITNESSES:
A. R. Appleman
Wm. L. Patton

INVENTORS
William T. Temple
Edward Y. Temple
BY Munn
ATTORNEYS.

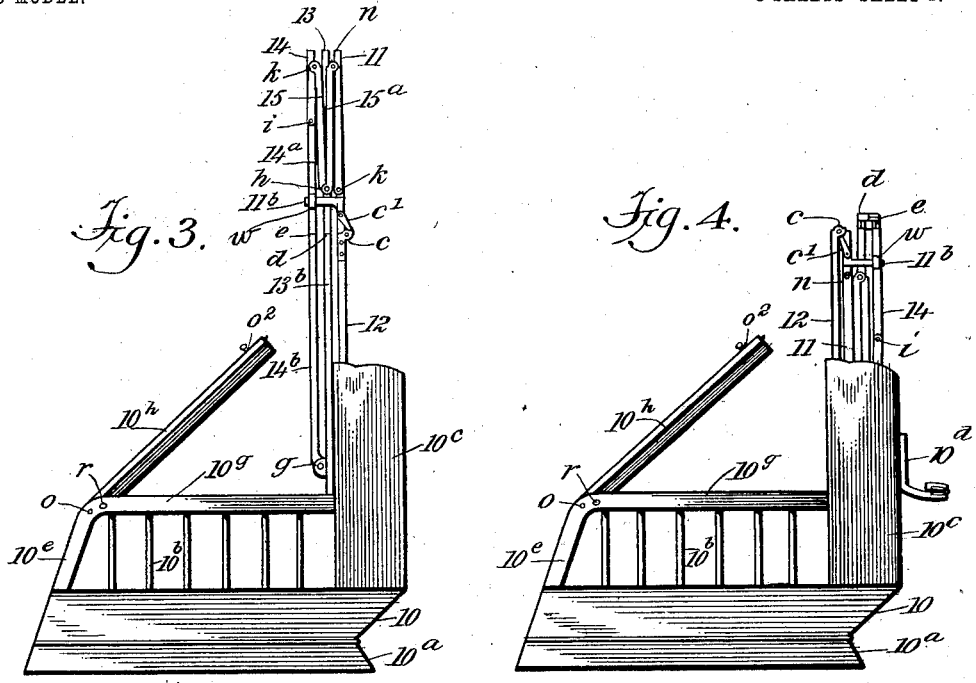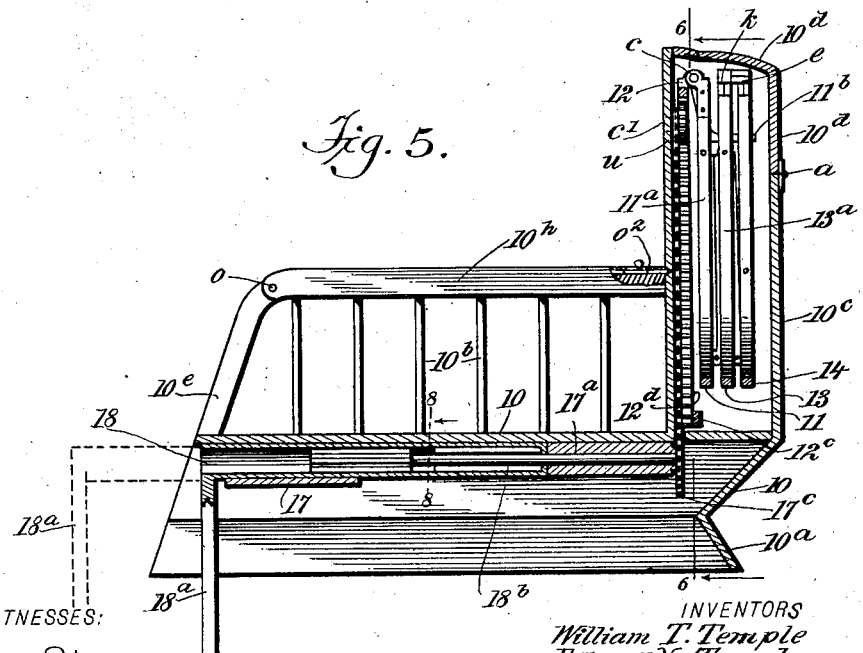

No. 727,492. PATENTED MAY 5, 1903.
W. T. & E. Y. TEMPLE.
FOLDING TOP FOR VEHICLES.
APPLICATION FILED SEPT. 19, 1902.
NO MODEL. 3 SHEETS—SHEET 3.

INVENTORS
William T. Temple
Edward Y. Temple

WITNESSES:

No. 727,492.  
Patented May 5, 1903.

UNITED STATES PATENT OFFICE.

WILLIAM T. TEMPLE AND EDWARD Y. TEMPLE, OF TRENTON, NEW JERSEY.

FOLDING TOP FOR VEHICLES.

SPECIFICATION forming part of Letters Patent No. 727,492, dated May 5, 1903.

Application filed September 19, 1902. Serial No. 124,032. (No model.)

*To all whom it may concern:*

Be it known that we, WILLIAM T. TEMPLE and EDWARD Y. TEMPLE, citizens of the United States, and residents of Trenton, in the county of Mercer and State of New Jersey, have invented a new and Improved Folding Top for Vehicles, of which the following is a full, clear, and exact description.

This invention has for its object to provide a folding top for vehicles which may be completely stowed in the hollow back of the vehicle-seat, a further object being to provide novel details of construction for the seat and top whereby the vehicle-top may be actuated to elevate it when folded by the manipulation of a crank-handle at the front of the seat.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1:
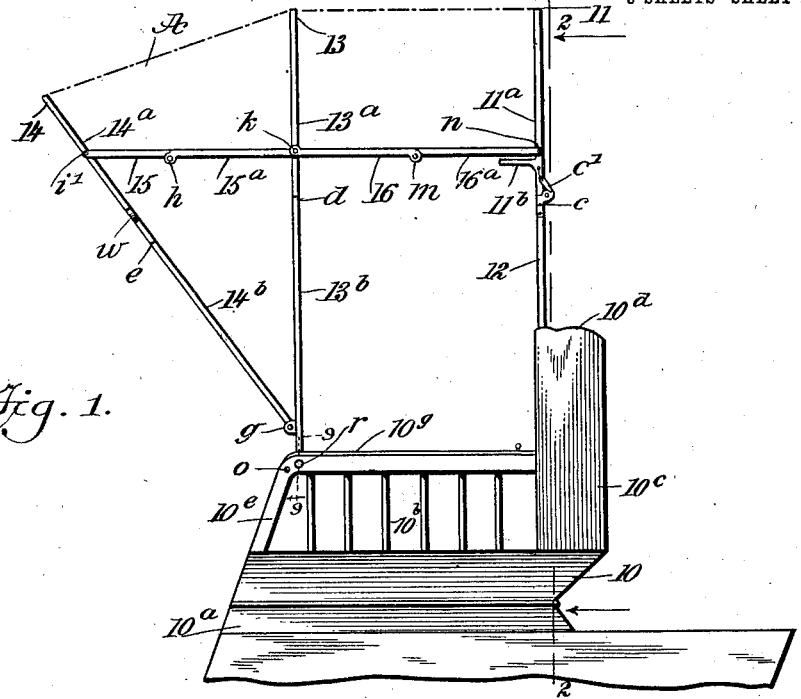
Figure 2:
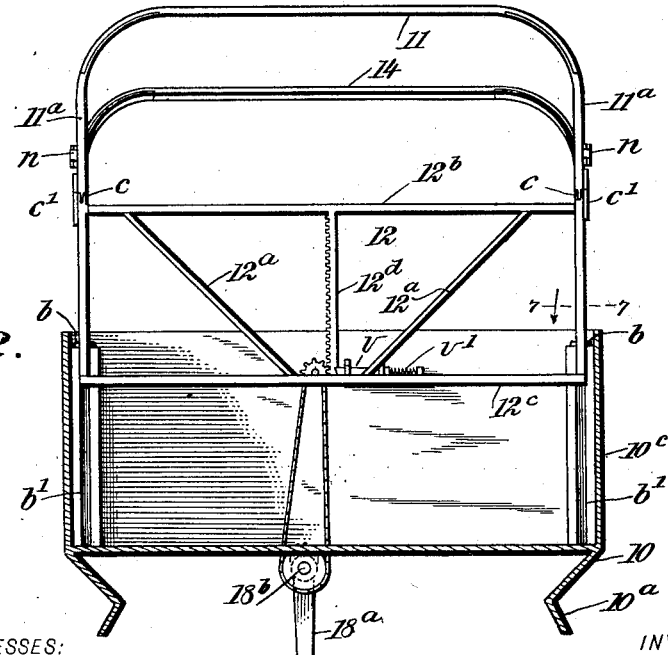

Figure 1 is a side elevation of the improvements shown in place on a vehicle-seat. Fig. 2 is a transverse sectional view of the same substantially on the line 2 2 in Fig. 1. Fig. 3 is a side view of the vehicle-seat and of the vehicle-top frame, partially folded for stowage. Fig. 4 is a like view of the seat and a side view of the top folded and partially inserted within the seat-back. Fig. 5 is an enlarged transverse sectional view substantially on the line 5 5 in Fig. 6. Fig. 6 is a sectional rear side elevation of the seat-back substantially on the line 6 6 in Fig. 5, showing the completely-folded top-frame stowed in the seat-back. Fig. 7 is a sectional plan view substantially on the line 7 7 in Fig. 2. Fig. 8 is a transverse sectional view of other novel features substantially on the line 8 8 in Fig. 5, and Fig. 9 is a transverse sectional view substantially on the line 9 9 in Fig. 1.

The invention may be applied upon any wheeled passenger conveyance having a seat and a back therefor, the latter for concealment of the vehicle-top when folded being preferably formed as a box-like receptacle.

In the drawings, 10 indicates a vehicle-seat having a skirt-board $10^a$ and a side railing $10^b$. The seat-back $10^c$ is in the form of a substantially rectangular box, the rear wall of which is preferably lower at the top edge than the parallel front wall, but the end walls are equal in height with the said front wall.

A cover $10^d$ is provided which extends from the upper edge of the rear wall of the hollow back $10^c$ and bends at a proper height forwardly, thus filling the opening at the top of the back when in place over the back. Preferably the cover $10^d$ is hinged at its lower transverse edge upon the rear wall of the hollow back, so as to be permitted to fold outward and downward, said hinged connection appearing at $a$ in Fig. 5.

The frame for the folding top is shown devoid of a covering for the sake of clearness and comprises as principal members three novel cover-supporting bows which will be described in their order.

The rearmost bow of the set consists of an arched top piece 11, that may be constructed of any suitable material and is bent near its ends, so as to provide two short depending limbs $11^a$, parallel with each other.

A sliding frame 12 substantially rectangular and consisting of light strong metal-bar material is held to reciprocate vertically in the hollow back $10^c$ by the loose engagement of a tongue-block $b$, formed or secured on each upright end portion of the rectangular frame 12 within a correspondingly-grooved guide-piece $b'$, projecting from the front wall of the back $10^c$, as shown for one of said connections in Fig. 7, said tongue-and-groove connections also appearing in Figs. 2 and 6. The depending limbs $11^a$ of the rear bow of the folding top are each hinged upon a respective upper corner of the sliding frame 12, these hinge connections consisting, respectively, of a rule-joint formation $c$, that is arrested from further flexure when the end uprights on the frame 12 are alined with respective limbs $11^a$. A spring-pressed pawl $c'$ is provided for each rule-joint $c$, and when the joints $c$ are adjusted to dispose the frame 12, alined with the members $11^a$, on the rear bow 11 said pawls engage with shoulders on the rule-joints, so as to hold the latter rigid until the pawls are purposely released, this adjustment of parts being indicated in Fig. 1.

The middle bow of the vehicle-top is provided with an arched top piece 13, having two depending parallel members $13^a$, hinged at their ends upon the upper ends of two similar prop-bars 13$^b$, these connections $d$ being rule-joints so disposed that the prop-bars may be folded inwardly or toward each other, but cannot flex outward beyond a vertical plane, the prop-bars being in effect extensions of the limbs 13$^a$. The remaining bow for the top-frame is formed with an arched top portion 14 and short depending limbs 14$^a$, that at their lower ends are connected to the upper ends of the prop-bars 14$^b$ by rule-joints $e$, which permit the inward flexure of said prop-bars. The lower extremities of the prop-bars 14$^b$ are respectively connected by hinge-joints $g$ upon the front edges of the prop-bars 13$^b$, near the lower ends of the latter, so that the front bow may be folded closely upon the middle one when this is desired.

Two similar spacing-bars each formed of two members 15 15$^a$ are furnished to connect the front frame-bow with the middle frame-bow 13. The members 15 15$^a$ of each spacing-bar are rule-jointed together by adjacent ends of the same, as at $h$, and the forward ends of the members 15 are respectively pivoted at $i$ upon the depending limbs 14$^a$ of the front frame-bow. The remaining ends of the two spacing-bar members 15$^a$ are hinge-jointed at $k$ upon the depending limbs 13$^a$ of the middle frame-bow, as indicated in Fig. 1.

The middle frame-bow having the depending limbs 13$^a$ is foldably connected with the rear top-bow having the depending limbs 11$^a$ by a pair of spacing-bars, each consisting of two members 16 16$^a$. The members 16 16$^a$ forming each of these spacing-bars are rule-jointed together, as indicated at $m$ in Fig. 1, while the rear end of the member 16$^a$ of each of said spacing-bars is lapped upon and pivoted to the depending limb 11$^a$ at a corresponding side of the top-frame, as shown at $n$ in Fig. 1.

The rear end of each spacing-bar member 15$^a$ is connected with a respective forward end of a spacing-bar member 16 to produce a rule-joint $k$, and, as before mentioned, said joints respectively are pivoted upon the depending limbs 13$^a$ of the middle frame-bow 13. It will be seen that the joints $m$ and $h$, that respectively connect the members 16 16$^a$ and 15 15$^a$ of the opposite spacing-bars, that respectively connect the rear frame-bow 11 with the middle bow 13 and the latter with the forward bow 14, are arranged to flex, so that the bar members may move upward at their rule-joints $m$ $h$ and when so adjusted permit the folding of the three bows together, the pivot-points $i$, $k$, and $n$ coacting with said rule-joints to effect such a result.

The arms at the sides of the vehicle-seat 10 each comprise a front post 10$^e$, erected at the front of the seat, near an end thereof, and a stationary rail 10$^g$, supported horizontally by engagement of its ends with the top of the post and front wall of the seat-back 10$^c$. Upon the fixed rail 10$^g$ at each end of the seat another rail 10$^h$ is pivoted, said pivot connection $o$ serving to loosely secure the front end of a rail 10$^h$ on a corresponding fixed rail, so that the pivoted rail may be rocked upward and removed at the rear end thereof from engagement with the hollow back 10$^c$.

As shown in Fig. 9, a suitable slot-like space $o'$ is provided between the fixed rail 10$^g$ and pivoted rail 10$^h$, this space affording a free passage for the lower end of each prop-bar 13$^b$. The fixed rail 10$^g$ at each side of the vehicle-body is cut away throughout its length, so as to produce a preferably convex track $p$ thereon at the inner side of a guard-flange $p'$, and, as clearly shown in Fig. 9, a foot $p^2$ is formed on the lower end of each prop-bar 13$^b$, these feet being concaved in their lower surfaces for engagement with the convex tracks $p$.

The lower surface of the hinged rail 10$^h$, that is mounted on each fixed rail 10$^g$, is concaved, so as to closely engage with the convex top surface of a respective foot $p^2$, which will thus be held from release when the hinged rail is secured, but will be permitted to traverse the slot $o'$, occupied by the prop-bar 13$^b$ and foot thereon.

The hinged rail members 10$^h$ at their rockable rear ends may each be detachably held in folded condition by means of a slide-bolt $o^2$, that at its latching end enters a notch formed to receive it in the front wall of the hollow back 10$^c$ when the slide-bolt is slid toward said notch, as shown in Fig. 5, and it is to be understood that this interlocking engagement of the slide-bolts $o^2$ with the seat-back may be effected either by spring-pressure or by manipulation, as may be preferred.

It will be evident that the three top frame-bows 11, 13, and 14 may be held reliably spaced apart by adjustment of the spacing-bars at each side of the frame, so as to aline their members, and thus fully open the rule-joints $h$ $m$, that will be held open by the tension of the vehicle-top covering A, that is represented by a dotted line in Fig. 1, coacting with the other means. The tension of the top-covering A is not sufficient to hold the vehicle-top in opened condition during a storm of wind, and to render the top stable when erected a positive lock is provided for each prop-bar 13$^b$, one lock being shown in Fig. 9, which locks are constructed as follows: A slide-bolt $r$ is loosely engaged in a transverse perforation in each rail member 10$^h$ and has a knob or the like on its end that projects from the fixed rail member 10$^g$ wherein the bolt slides. A socket or transverse perforation is formed in the corresponding prop-bar 13, that occupies the slot $o'$ for the reception of the opposite end of the slide-bolt $r$, which may be spring-pressed therein, as indicated in Fig. 9, this engagement of the slide-bolts $r$ with the prop-bars 13$^b$ occurring when said prop-bars are vertically positioned and the vehicle-top frame is fully erected for support of a covering.

The vertically-slidable frame 12 may be stiffened by the braces $12^a$, diagonally secured between the upper frame-bar $12^b$ and lower frame-bar $12^c$ by affixing corresponding ends thereon, as represented in Fig. 2. A toothed rack-bar $12^d$ is centrally and vertically secured in the frame 12 by the fixture of its ends upon the transverse frame-bars $12^b$ $12^c$. A tubular box 17 is secured upon the lower side of the seat-board 10 and extends from the front portion of said seat rearwardly at or near the center of length of the seat.

In the tubular box 17 a hollow shaft 18 is loosely held, this shaft having a crank-handle $18^a$ secured on its end nearest the front end of the tubular box 17. Into the forward end of the hollow shaft 18 a shaft extension $18^b$ is inserted, the latter comprising a cylindrical body portion extending from the rear end of the hollow shaft 18 through another box $17^a$, hanging from the seat 10 in axial alinement with the box 17. On the forward end of the shaft extension $18^a$ a plurality of wings $s$ are formed, that loosely occupy spaces between similar wings $s'$, projecting inward from the inner surface of the hollow shaft 18 at and near its end nearest the box $17^a$. (See Figs 5 and 8.)

It will be seen that if the rear end of the shaft extension $18^b$ is held from sliding forwardly the hollow shaft 18 may by a pull on the handle $18^a$ be drawn forwardly, as indicated by dotted lines in Fig. 5, and thus effect the interlocked engagement of the wings $s\ s'$, whereby the turning of the crank-handle $18^a$ will rotate the hollow shaft 18 and the shaft extension $18^b$ together in either direction, as may be desired.

The rear end of the shaft extension $18^b$ projects from the rear end of the box $17^a$ sufficiently to receive a sprocket-gear $17^b$, connected by a sprocket-chain $17^c$ with a sprocket-gear mounted and secured on a short shaft $t$, held to rotate on the rear side of the front wall of the hollow back $10^c$. Upon the rear end of the shaft $t$ a spur-gear $u$ is secured, which meshes with the teeth on a vertical rack-bar $12^d$, and it will be seen that by rotating the crank-handle $18^a$ in a proper direction the rotary movement transmitted to the spur-gear $u$ will elevate the sliding frame 12 from the bottom of the hollow back 10 to a point near the top of said back, as represented in Fig. 2, the lowered adjustment of the frame 12, that may be effected by an opposite rotary movement of the crank-handle $18^a$, appearing in Fig. 6.

When the sliding frame 12 is fully elevated, a detent-latch bolt $v$ is automatically engaged at its latching end within a notch formed in the back of the rack-bar $12^d$, said bolt being pressed toward the rack-bar by a spring $v'$, as indicated in Fig. 2.

When the frame of the vehicle-top is to be folded compactly and introduced within the hollow back $10^c$, the slide-bolts $r$ are manipulated for release of the prop-bars $13^b$, so that said bars, along with the arms $13^c$, may be slid toward the frame 12 and the erected rear frame-bow 11, carried by said frame. The prop-bars $14^b$ of the front bow 14 are now folded against the middle bow 13, and this folded adjustment of the front bow will introduce the free ends of two keeper-arms $11^b$, that project forwardly from the depending members $11^a$, through looped formations $w$, that are on the depending portions $14^a$ of the front bow 14, which will keep the three bows folded and prevent lateral strain on their joints, this relative adjustment of parts being shown in Fig. 3. The next step in the folding operation consists in the release of the lower portions of the prop-bars $13^b$ and feet $p^2$ thereon from the arms on the vehicle-seat. To effect this, the slide-bolts $o^2$ are retracted, as well as the slide-bolts $r$, which will permit the hinged rail members $10^h$ to be rocked upwardly and also permit the connected lower ends of the prop-bars $14^b$ $13^b$ at each side of the vehicle-seat to be folded toward each other, the flexure of the rule-joints $d\ e$ permitting this inward-folding movement. The length of the prop-bars $13^b$ $14^b$ is such as will allow the pair of said bars at each side of the vehicle-top to fold toward and against the rule-joints $c$, which connect the depending limbs $11^a$ on the rear frame-bow 11 with the upper corners of the frame 12. As the frame 12 is still fully elevated, it will be obvious that by releasing the pawls $c'$ the folded bows 13 14 and attached braces thereon may be rocked rearward and downward on the hinge-joints $c$, so as to insert the lower ends of the prop-bars $13^b$ $14^b$ within the hollow back $10^c$ at the rear side of the frame 12, as is shown in Fig. 4. The operator now turns the crank-handle $18^a$ in a proper direction for lowering the sliding frame 12, which when fully lowered will effect the disposal of the folded frame of the vehicle-top completely within the hollow back $10^c$, whereupon the hinged cover $10^d$ may be rocked upon the upper edge portion of the back piece $10^e$, thus concealing the folded frame and protecting the same from the elements. When the top-frame is stored in the hollow back $10^c$, the tubular shaft 18 may be moved rearward, so as to dispose the crank-handle $18^a$ beneath the seat 10, and thus completely house the entire foldable top and its attachments.

Obviously a reversal of the described folding operation will serve to erect the folding frame above the vehicle-seat 10 to receive a suitable covering for the protection of the occupants of the vehicle.

Having thus described our invention, we claim as new and desire to secure by Letters Patent—

1. A folding top-frame for vehicles, comprising three bows having depending members; prop-bars respectively connected with the ends of said members on the front and middle bows by inwardly-flexing rule-joints, two spacing-bars at each side of the top-frame, each spacing-bar consisting of two portions, a rule-joint connecting these portions of each spacing-bar and adapted to flex upwardly, and means for supporting the top-frame erected upon a vehicle-seat.

2. A folding top-frame for vehicles, comprising three bows, each bow having two depending limbs, a slidably-supported quadrangular frame jointed at its upper corners on the depending limbs of one of the frame-bows, prop-bars jointed on the depending limbs of the remaining frame-bows, spacing-bars adapted to flex upward between their ends, pivot connections between said ends and the depending limbs on the bows, and means for supporting the bows and quadrangular frame elevated on a vehicle-seat.

3. A folding top-frame for vehicles, comprising three bows, each bow having two depending limbs, a slidably-supported angular frame, joints connecting the top of the angular frame with one of the bows on the ends of its depending limbs, spring-pressed pawls adapted to lock said joints from flexure, prop-bars jointed on depending limbs of the remaining bows, spacing-bars adapted to flex upwardly between their ends, pivot connections between said ends and the depending limbs on the bows, and means for supporting the bows and angular frame elevated on a vehicle-seat.

4. The combination with a foldable top-frame for vehicles, of a hollow seat-back, a cover for the top of said seat-back held to rock thereon, and means for lowering the folded top-frame into the hollow back of the seat when the cover is removed.

5. The combination with a foldable top-frame for vehicles, held to slide upon the arms of the vehicle-seat, and longitudinally thereof, of a hollow back for the seat, and a device operative from the front of the seat and adapted to lower the folded top-frame into the hollow back and also elevate said top-frame for removal from the hollow back.

6. The combination with a foldable top-frame for vehicles, depending prop-bars jointed upon the bows of the top-frame, and a foot on each prop-bar, of seat-arms formed with slots wherein the prop-bars and feet are adapted to slide, and means for detaching said prop-bars and feet from the seat-arms.

7. The combination with a foldable top-frame for vehicles, comprising bows, depending prop-bars on the bows, foldable spacing-bars thereon, and an angular frame jointed on the rear one of the bows, of a hollow seat-back, wherein the angular frame slides, a rack on the angular frame, and gearing in the hollow back engaged with the rack and operative from the front of the vehicle-seat, and adapted to move the rack and frame into and out of the hollow seat-back.

8. The combination with a hollow seat-back, and upright guides therein, of a quadrangular frame slidably engaging the guides, and foldable portions of a top-frame jointed upon the upper portion of the slidable frame.

9. The combination with a hollow seat-back, and a quadrangular frame held to reciprocate therein, of a foldable top-frame, rule-jointed upon the upper portion of the reciprocal frame.

10. The combination with a hollow seat-back, and two spaced guides having upright grooves, of a frame having side members slidably engaging the grooved guides, and foldable portions of a top-frame jointed upon the slidable frame.

11. The combination with a hollow seat-back, guides in said seat-back, and a frame having side members loosely engaged with the guides, of sprocket-and-chain gearing held in the hollow seat-back, and means for operating said gearing to reciprocate the slidable frame.

12. The combination with a frame held to slide in a seat-back, of a rack on the frame, gearing connected with the rack, and a shaft that is adjustable for length, and is hung below on the seat, and adapted by rotation to actuate the gearing for reciprocation of the slidable frame.

13. The combination with a frame held to slide upright on a seat-back, of a vertical rack on the frame, a spur-gear rotatably supported and meshing with the rack, sprocket-gearing connected by a chain and adapted to transmit motion to the spur-gear, a shaft carried by the seat and adapted to actuate the sprocket-gearing, and means for turning the shaft.

14. The combination with a plurality of frame-bows for a vehicle-top, spacing-bars having jointed members and pivoted at their ends on the bows, and depending prop-bars jointed on sundry of the frame-bows, of two slotted seat-rails loosely engaged by two opposite prop-bars, and spring-pressed slide-bolts adapted to hold said prop-bars stationary on the slotted rails.

15. The combination with a frame held to slide on a seat-back, a rack on said frame, and gearing connected with the rack, of a two-part telescoping shaft held to rotate on the seat, and a crank-handle on an end of the shaft.

16. The combination with a plurality of frame-bows for a vehicle-top, and foldable spacing members thereon, of two laterally-extended keeper-arms on one of the frame-bows, and loops on another of the frame-bows, adapted to receive and hold the keeper-arms when the bows are folded together.

In testimony whereof we have signed our names to this specification in the presence of two subscribing witnesses.

WILLIAM T. TEMPLE.
    EDWARD Y. TEMPLE.

Witnesses:
 JOHN H. KEEFER,
 WM. W. HOWELL.